Jan. 3, 1950 F. J. DOFSEN ET AL 2,492,973
PROCESS FOR BONDING THERMOPLASTIC MATERIALS
Filed July 15, 1947 2 Sheets-Sheet 1
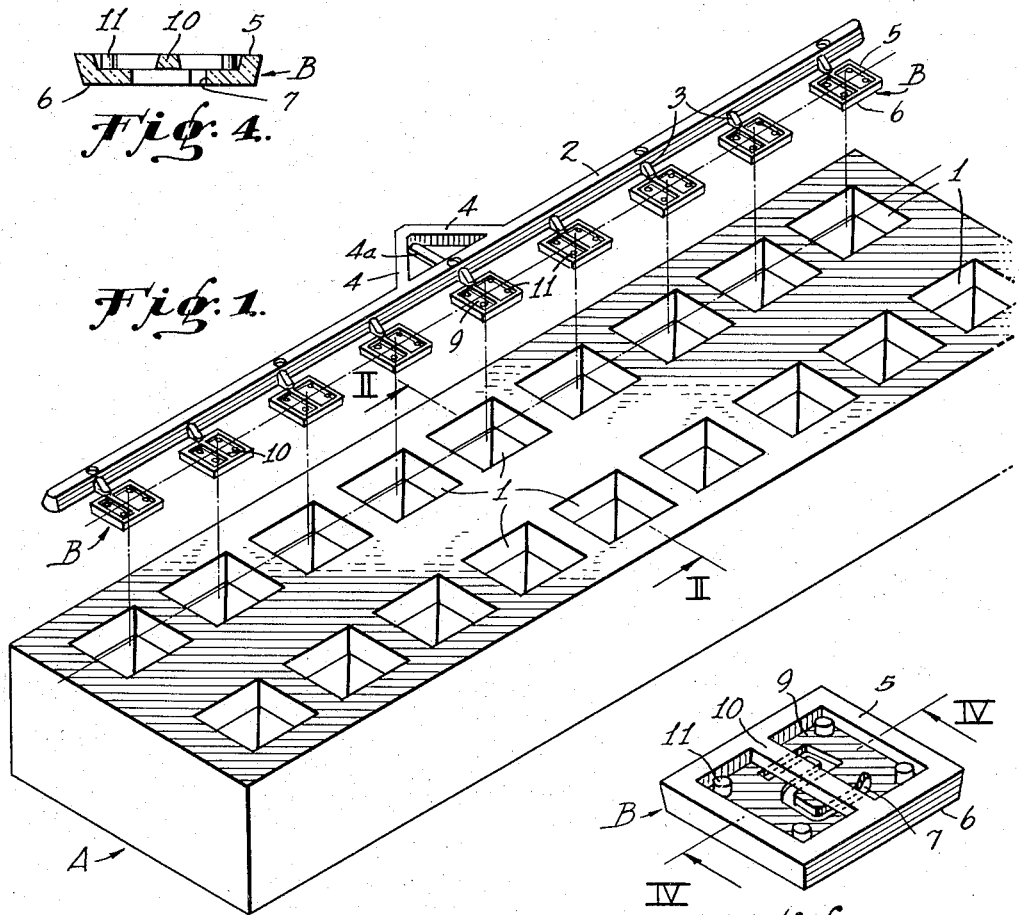
INVENTORS
ELMER L. DANIELSON
BY FLOYD J. DOFSEN
Munn, Liddy & Glaccum
ATTORNEYS Jan. 3, 1950     F. J. DOFSEN ET AL     2,492,973
PROCESS FOR BONDING THERMOPLASTIC MATERIALS
Filed July 15, 1947     2 Sheets-Sheet 2
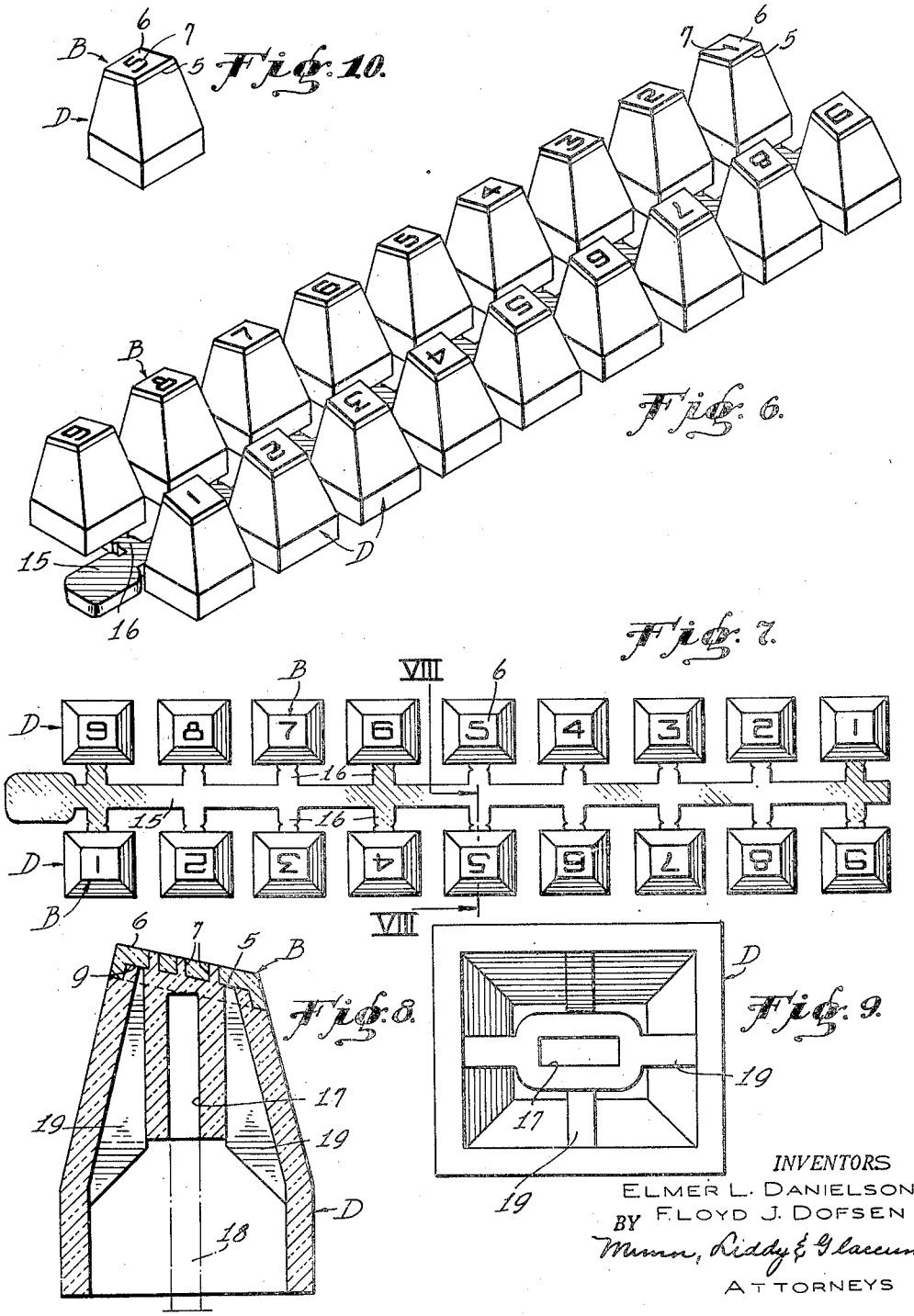
INVENTORS
ELMER L. DANIELSON
BY FLOYD J. DOFSEN
Munn, Liddy & Glaccum
ATTORNEYS Patented Jan. 3, 1950

2,492,973

UNITED STATES PATENT OFFICE 2,492,973

PROCESS FOR BONDING THERMOPLASTIC MATERIALS

Floyd J. Dofsen, Millbrae, and Elmer L. Danielson, Oakland, Calif.

Application July 15, 1947, Serial No. 761,128

3 Claims. (Cl. 18—59)

An object of our invention is to carry out a process of bonding thermoplastic materials to provide a product consisting of two or more of the materials whose sole connection to each other is the bond. The materials may be of different colors.

A further object of our invention is to provide a process of bonding thermoplastic materials where one of the thermoplastics is precast and the surface which is to be bonded to the second thermoplastic material is coated with a solvent, whereupon the coated precast material is placed in a mold that is to receive the second injection of thermoplastic material, and the second material will become bonded to the first. The precast material may form the top of a key and have slots therein defining the character on the key.

The apparatus for carrying out the process permits the premolding of a plurality of the first articles and the subsequent molding of the second thermoplastic material to all of the precast articles simultaneously, thereby greatly speeding up the manufacture of the two-material product.

Other objects and advantages will appear in the following specification, and the novel features of the device will be particularly pointed out in the appended claims.

Our invention is illustrated in the accompanying drawings forming a part of this application, in which:

Figure 1 is a perspective view of the lower mold of a set of molds and showing the precast or premolded members in a position to receive the solvent and then to be dropped into the recesses provided in the lower mold;

Figure 2 is an enlarged transverse section of the lower mold taken along the line II—II of Figure 1 and further illustrates the upper mold in position and the second thermoplastic material injected into the mold cavities;

Figure 3 is an isometric view of the precast thermoplastic member when looking at the under face thereof;

Figure 4 is a transverse section taken along the line IV—IV of Figure 3;

Figure 5 is an isometric view of the precast thermoplastic member shown in Figure 3, but when looking at the outer face thereof;

Figure 6 is a perspective view of a plurality of articles formed of the two thermoplastic materials;

Figure 7 is a top plan view of Figure 6;

Figure 8 is a vertical section on an enlarged scale of one of the articles shown in Figure 7;

Figure 9 is a bottom plan view of the article shown in Figure 8; and

Figure 10 is an isometric view of the completed article.

While we have shown only the preferred form of our invention, it should be understood that various changes or modifications may be made within the scope of the appended claims without departing from the spirit and scope of the invention.

In carrying out our invention, we provide a lower mold indicated generally at A in Figure 1 and this mold has a plurality of cavities 1 therein. A plurality of precast key finger engaging pieces or wear facings B are shown connected to a sprue 2 by branch sprues 3. The sprues together with said finger pieces having been previously precast in the form of wafers from thermoplastic material in a separate mold, not shown. In addition to the sprues 2 and 3, feeding branch sprues 4 in the shape of a V lead to the sprue 2 and a central branch sprue 4a also connects with the sprue 2. The branch sprues 4 and 4a constitute a handle which permits the operator to hold the precast key caps in a position directly above the row of mold cavities 1 in which they are to be dropped. This is clearly shown in Figure 1.

A solvent, such as acetone, is applied to the under surfaces 5 of the key caps so as to soften these surfaces to an appreciable depth. The key caps are then severed from the branch sprues 3 and will drop by gravity into the mold cavities 1. Since there are two rows of mold cavities illustrated in Figure 1, there will be two groups of key caps positioned above these cavities and after their rear faces have been softened by means of the acetone, the key caps of both groups will be severed from their branch sprues and will drop into the bottoms of the cavities of both rows. This arrangement speeds up the process of manufacturing a pluraltiy of keys at a single time. The branch sprues 4 and 4a act as a hand grip for supporting the entire group of key caps in one row, and these key caps need not be touched by hand during the application of acetone to their rear faces nor in the severing of the key caps from the branch sprues 3 and the dropping of them into the mold cavities.

The particular construction of one of the key caps is shown in Figures 3, 4 and 5. We do not wish to be confined to any particular shape that the precast thermoplastic member B will take, because countless articles may be formed of two thermoplastic materials and can be bound together in the same manner. The key caps shown in Figures 1 to 5, inclusive, and the completed keys shown in Figures 6 to 10, inclusive, are only set forth as one example of how our process can manufacture a group of articles simultaneously. The outer face 6 of the key cap B is shown in Figure 5 and the face has a slot 7 formed therein in the shape of a core, such as the number "5." The under face 5 of the key cap is indicated in Figure 3 and it will be seen that a recess 9 is formed in the rear face that communicates with the slot 7 thus providing a surrounding margin on this face of the cap. A reinforcing rib 10 may extend across the recess and integral projections 11 may be arranged at the four corners of the recess for the purpose of providing a more perfect bond between the precast key cap and the remainder of the key.

In Figure 2 the lower mold A is shown with its cavities 1 receiving the key caps B, which are placed in an inverted position in the bottoms of the cavities. As already stated, the rear faces 5 of the key caps have had a solvent, such as acetone, applied thereto to soften the rear surfaces to an appreciable depth. The upper mold C is now placed over the lower mold and the upper mold carries core members 12 that enter the cavities 1 for causing the second injection of thermoplastic material to form the body of a key of the desired shape and structure. The second material will be bonded to the cap.

The upper mold has a longitudinally extending groove 13 that will receive the second thermoplastic material and branch grooves 14 extending from the central groove will convey the material to the mold cavities 1. The injection of the second thermoplastic material will cause this material to fill the cavity spaces not occupied by the key caps and the core members. A portion of the second thermoplastic material will flow under pressure into the recess 9 and will fill the slot 7. The second material is preferably of a different color from that of the first so that the material filling the slots 7 will form characters that will be in striking contrast to the color of the outer surface of the key cap.

Figure 6 illustrates the group of completed articles removed from the lower and upper molds with the keys D still connected to the central sprue 15 by branch sprues 16. The second material forming the body of each key cap will be perfectly and permanently bonded to the first material forming the finger piece thereof, due to the fact that the injection of the second material under pressure has taken place while the solvent has softened the rear face of the finger piece to an appreciable depth. It is a simple matter to break off the completed keys from the branch sprues and these caps will take the shape of that shown in Figures 8, 9 and 10. The rear faces 5 of the key caps B will be bonded to the keys D along their entire abutting surfaces.

The core 12 is shaped so that the second thermoplastic material will form a socket 17 in the cap D for receiving a key shank indicated by the dot dash line at 18 (Fig. 8). The socket 17 is spaced from the inner surfaces of the key by ribs 19 and these ribs act as reinforcing members for the key socket. There will be no wear noticeable on the key cap from use on an adding or multiplying machine or the like, because the number "5" for example shown in Figure 5, will have a depth of material equal to the entire thickness of the finger engaging piece or wear facing. The entire key cap will therefore have to wear away before the character will disappear.

We claim:

1. In the herein described process of molding at least two thermoplastic materials together to form a key cap, the steps of precasting a thermoplastic face member having a character perforation therethrough, providing a hollow key mold set with the base thereof extending downwardly, applying a solvent to the under surface of the face member to soften it, dropping said face member in an inverted position into the bottom of the mold, and injecting under pressure a second thermoplastic material into the face member perforation and body cavity of the mold to interfuse with the softened face member and effect a permanent bond therewith.

2. The method of molding two thermoplastic materials of different color together to form a key cap comprising a body and a face member on one end thereof, consisting of preforming a plurality of thermoplastic cap face members interconnected by a sprue and each having a character slot therein, treating the lower surfaces of said face members with a solvent to soften them, providing inverted cap body molds, severing said caps from the sprue and dropping them into the bottom of said inverted body molds with their lower surfaces uppermost therein, filling said molds and the face members with a second thermoplastic material under pressure to form characters in the slots of the face members and form the body portions of the several caps, said second material interfusing with the softened cap surfaces to bond the parts of each cap into a homogeneous mass.

3. The method of molding a finger piece for computing machine keys consisting in first molding the finger engaging face portion thereof in the form of a wafer of thermoplastic material of a given color having an under marginal edge and a central throughway opening depicting a key character, applying a solvent to the lower surface of said wafer, providing a mold for the body of the finger piece, placing the wafer in inverted position in one end of the mold and introducing into the other end of said mold thermoplastic material of a contrasting color under pressure to force it into the character opening of the face of the wafer and into union with the under margin of the wafer.

FLOYD J. DOFSEN.
ELMER L. DANIELSON.

REFERENCES CITED

The following references are of record in the file of this patent:

UNITED STATES PATENTS

| Number | Name | Date |
|---|---|---|
| 202,441 | Hyatt | Apr. 16, 1878 |
| 1,668,590 | Hilfrich | May 8, 1928 |
| 1,738,696 | Elias | Dec. 10, 1929 |
| 2,120,553 | Flader | June 14, 1938 |
| 2,217,661 | Anderson | Oct. 15, 1940 |
| 2,254,232 | Marcus | Sep. 2, 1941 |
| 2,345,305 | Thornton | Mar. 28, 1944 |
| 2,350,787 | Martin | June 6, 1944 |

FOREIGN PATENTS

| Number | Country | Date |
|---|---|---|
| 199,491 | Switzerland | Aug. 31, 1938 |
| 521,056 | Great Britain | May 10, 1940 |